US012676791B2

(12) United States Patent
Mihira

(10) Patent No.: US 12,676,791 B2
(45) Date of Patent: Jul. 7, 2026

(54) INFORMATION PROCESSING APPARATUS THAT PERFORMS WIRELESS NETWORK SETTING PROCESSING WITH A FIRST OPERATING SYSTEM WHEN AN APPLICATION OPERATING ON A SECOND OPERATING SYSTEM CANNOT PERFORM THE SETTING, CONTROL METHOD OF INFORMATION PROCESSING APPARATUS, AND STORAGE MEDIUM

(71) Applicant: CANON KABUSHIKI KAISHA, Tokyo (JP)

(72) Inventor: Yoshiro Mihira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 18/613,018

(22) Filed: Mar. 21, 2024

(65) Prior Publication Data
US 2024/0348494 A1      Oct. 17, 2024

(30) Foreign Application Priority Data

Apr. 14, 2023    (JP) ................................. 2023-066566

(51) Int. Cl.
*G06F 15/177* (2006.01)
*G06F 3/12* (2006.01)
*H04L 41/0803* (2022.01)

(52) U.S. Cl.
CPC ........ *H04L 41/0803* (2013.01); *G06F 3/1203* (2013.01); *G06F 3/1236* (2013.01)

(58) Field of Classification Search
CPC ... H04L 41/0803; G06F 3/1203; G06F 3/1236

USPC .......................................................... 709/220
See application file for complete search history.

(56) References Cited

U.S. PATENT DOCUMENTS

| | | | | |
|---|---|---|---|---|
| 10,880,166 | B2 * | 12/2020 | Duda ...................... | H04L 41/22 |
| 11,178,018 | B2 * | 11/2021 | Duda ................... | H04L 41/0654 |
| 11,757,715 | B2 * | 9/2023 | Duda .................... | H04L 43/065 |
| | | | | 709/220 |
| 12,164,392 | B1 * | 12/2024 | Sethi ...................... | G06F 16/128 |
| 12,255,909 | B2 * | 3/2025 | Sethi ................... | H04L 63/0236 |
| 12,321,243 | B2 * | 6/2025 | Sethi .................... | G06F 11/1464 |
| 2015/0382136 | A1 | 12/2015 | Mihira et al. .......... | H04W 4/80 |
| 2017/0046107 | A1 | 2/2017 | Mihira ...................... | G06F 3/12 |
| 2019/0357030 | A1 | 11/2019 | Mihira et al. .......... | H04W 4/80 |
| 2024/0386354 | A1 * | 11/2024 | Sethi ................ | G06Q 10/06375 |
| 2025/0119500 | A1 * | 4/2025 | Mihira ................. | H04W 48/20 |
| 2025/0119504 | A1 * | 4/2025 | Iura ...................... | H04N 1/0048 |
| 2025/0233950 | A1 * | 7/2025 | Iura .................... | G06F 9/45545 |

FOREIGN PATENT DOCUMENTS

JP          2010-238130          10/2010

* cited by examiner

*Primary Examiner* — Alicia Baturay
(74) *Attorney, Agent, or Firm* — Venable LLP

(57) ABSTRACT

An information processing apparatus that operates with a first OS and that includes an application configured to perform wireless network setting processing and to operate on a second OS controllable on the first OS includes a control unit configured to execute control processing for performing specific setting processing in the wireless network setting processing on the first OS in a case where the application is unable to perform the specific setting processing.

11 Claims, 7 Drawing Sheets

401
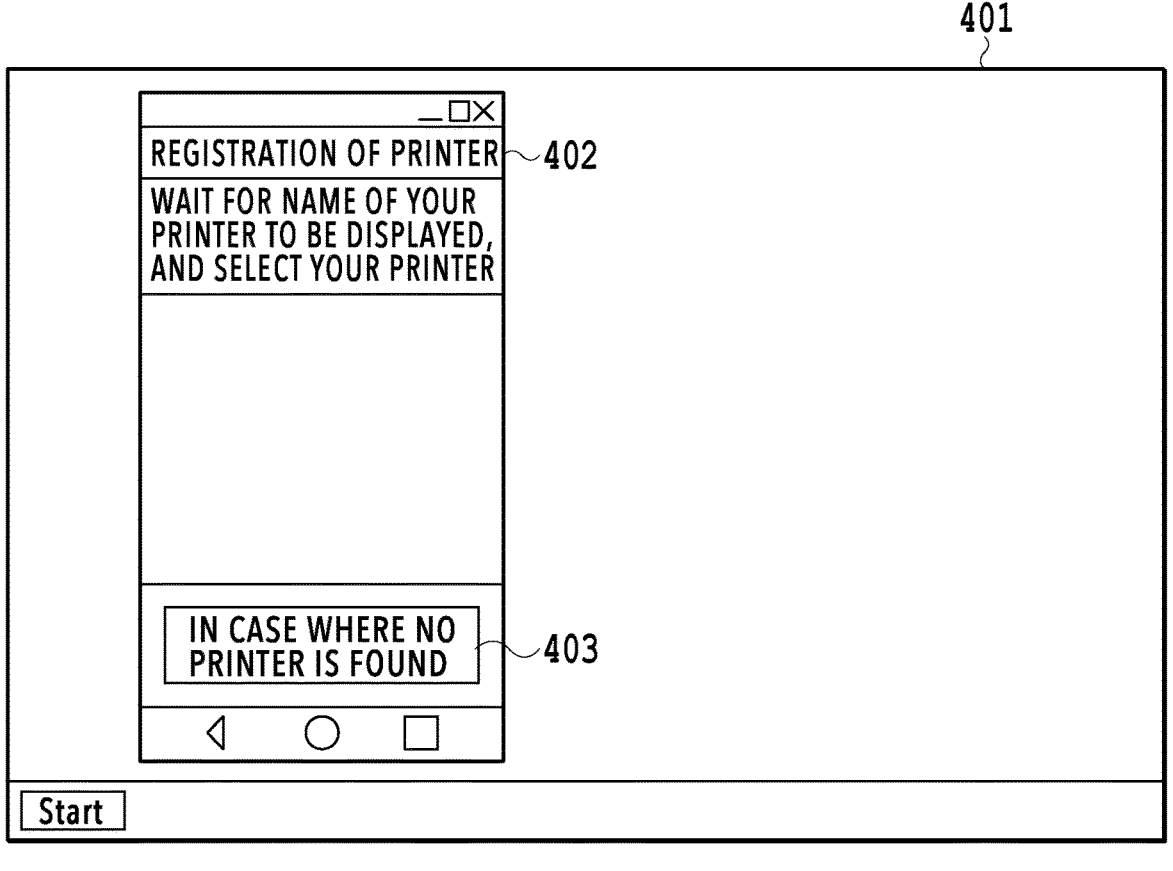
FIG.4A
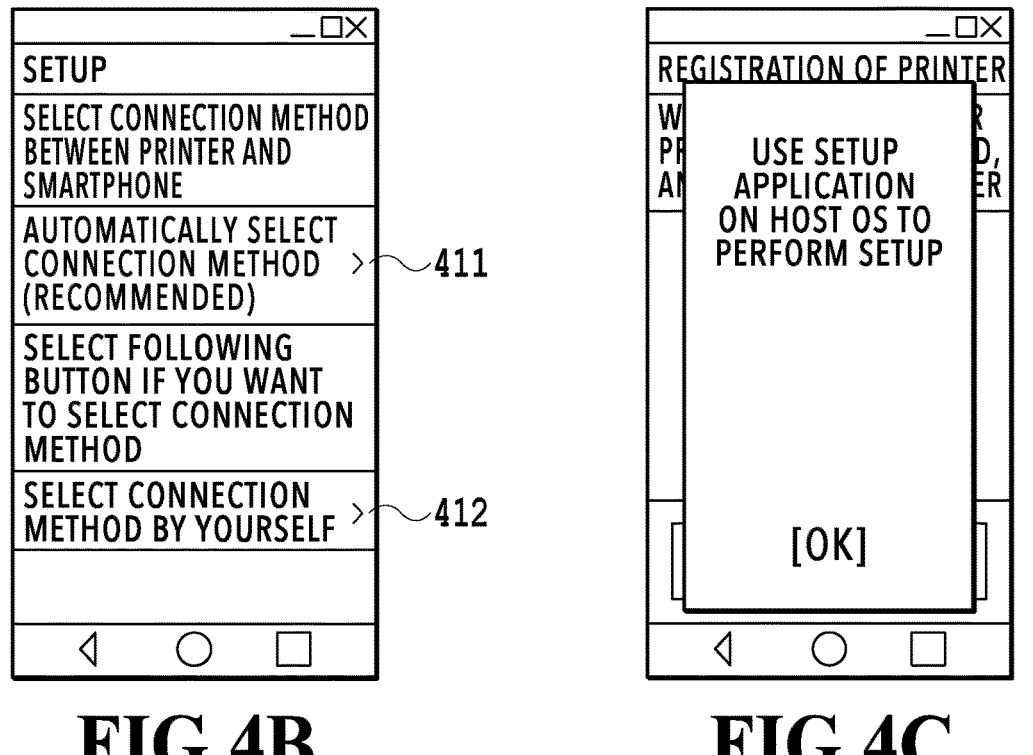
FIG.4B          FIG.4C

INFORMATION PROCESSING APPARATUS THAT PERFORMS WIRELESS NETWORK SETTING PROCESSING WITH A FIRST OPERATING SYSTEM WHEN AN APPLICATION OPERATING ON A SECOND OPERATING SYSTEM CANNOT PERFORM THE SETTING, CONTROL METHOD OF INFORMATION PROCESSING APPARATUS, AND STORAGE MEDIUM

BACKGROUND

Field

The present disclosure relates to an information processing apparatus, a control method of the information processing apparatus, and a program.

Description of the Related Art

In recent years, network setting of a printer or the like can be performed by using a mobile application.

Japanese Patent Laid-Open No. 2010-238130 describes a technique in which, on a host operating system (OS) included in a PC (information processing apparatus), another OS can be made to run as a guest OS by using a virtual machine. For example, this allows Android (registered trademark) that is a mobile OS to run as the guest OS on Windows OS (registered trademark) that is running as the host OS, and allows a mobile application for Android to be executed on Windows OS. In other words, the network setting of the printer or the like can be performed by using the mobile application on the PC.

SUMMARY

There is a demand for a technique of improving usability of network setting.

A program according to one aspect of the present disclosure is a program that operates as an information processing apparatus in a second OS controllable on the first OS, the program causing the information processing apparatus to function as a control unit that executes control for performing specific setting processing in wireless network setting processing on the first OS in the case where a first application configured to perform the wireless network setting processing and to operate on the second OS is unable to perform the specific setting processing.

Further features of the present invention will become apparent from the following description of exemplary embodiments with reference to the attached drawings.

BRIEF DESCRIPTION OF THE DRAWINGS

FIGS. 4A to 4C are diagrams illustrating a display screen of a network setting application;

DESCRIPTION OF THE EMBODIMENTS

Preferable embodiments of the present disclosure are explained below as examples with reference to the drawings. However, regarding the present disclosure, it should be understood that appropriate modifications and improvements of the embodiments described below that are made within a scope not departing from the gist of the present disclosure based on the knowledge common to those skilled in the art are also included in the scope of the present disclosure.

Embodiment 1

An information processing apparatus and a communication apparatus included in a communication system of the present embodiment are explained. Although a personal computer (PC) is given as an example of the information processing apparatus in the present embodiment, the information processing apparatus is not limited to the PC as long as it is an information processing apparatus capable of running a guest OS. For example, various apparatuses such as a mobile terminal, a smartphone, a tablet terminal, a personal digital assistant (PDA), and a digital camera are applicable as the information processing apparatus. Moreover, although a printer is given as an example of the communication apparatus in the present embodiment, the communication apparatus is not limited to the printer, and various apparatuses are applicable as the communication device as long as they are apparatuses capable of performing wireless communication with the information processing apparatus. For example, in the case of the printer, an inkjet printer, a full-color laser beam printer, a monochrome printer, and the like are applicable. Moreover, in addition to the printer, a copier, a facsimile apparatus, a mobile terminal, a smartphone, a laptop computer, a tablet terminal, a PDA, a digital camera, an audio reproducing device, a television set, a smart-speaker, and the like are applicable. Furthermore, a multi-function peripheral having multiple functions such as a copy function, a FAX function, and a printing function are applicable.

Note that a virtualization technique relating to the guest OS described above is described later by using a software configuration diagram of FIG. 2.

Moreover, in the present embodiment, the information processing apparatus has a function of executing network setup of another apparatus by using a setting application. In the present embodiment, the information processing apparatus 101 executes network setup processing by the setting application. Note that the network setup of the other apparatus is processing of connecting the other apparatus to an access point forming a network. Specifically, in the present embodiment, the network setup is processing of controlling the information processing apparatus such that the information processing apparatus sends connection information (SSID or password) for connection to the access point to the communication apparatus through communication with the communication apparatus using a predetermined protocol.

Figure 1:
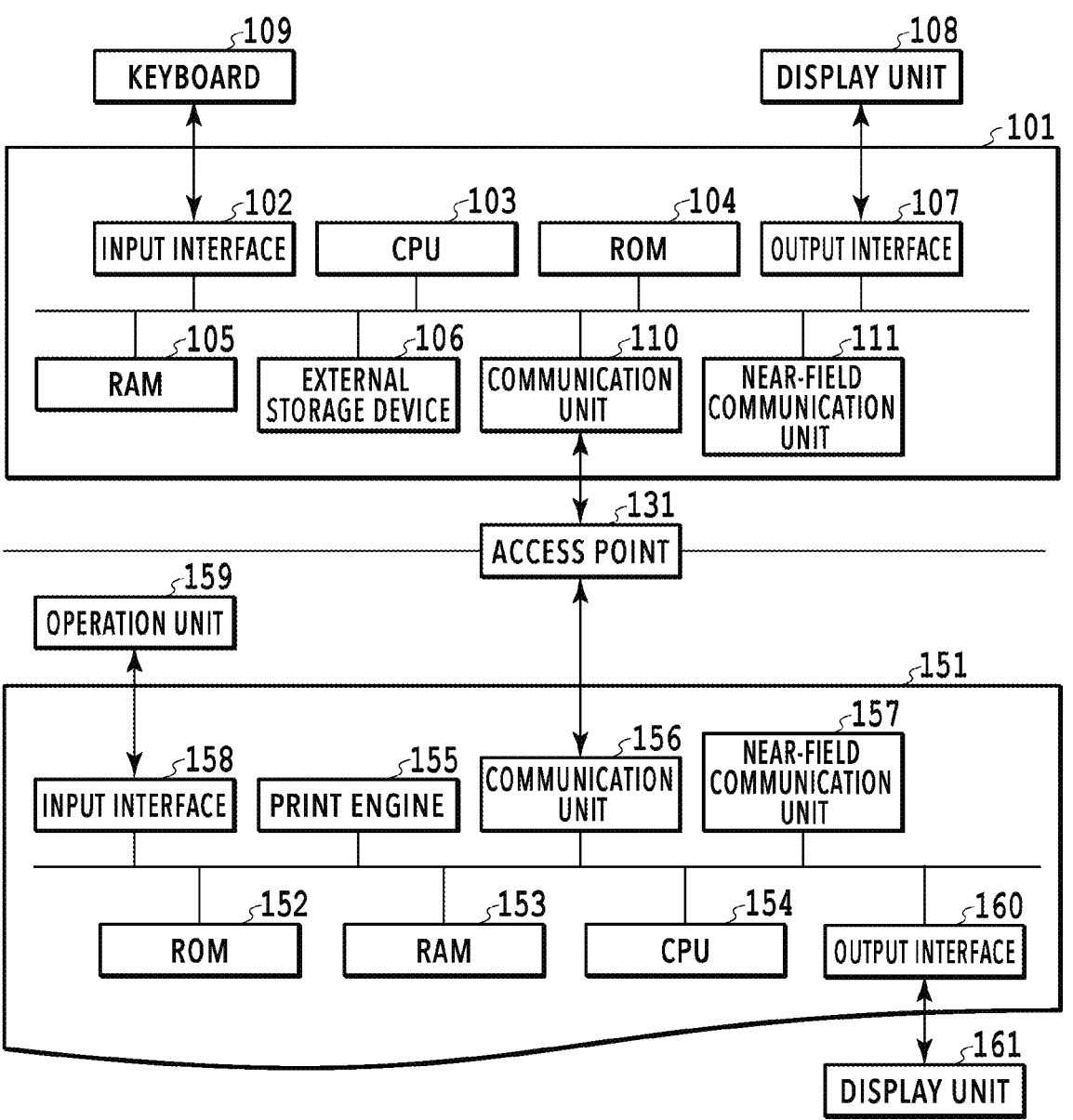
FIG. 1 is a diagram illustrating a configuration of a communication system.

First, configurations of the information processing apparatus and the communication apparatus capable of communicating with the information processing apparatus in the present embodiment are explained with reference to the block diagram of FIG. 1. Although the present embodiment is described by using the following configurations as examples, the present embodiment is applicable to an apparatus that can perform communication with the communication apparatus, and the functions are not particularly limited to those in the drawings.

The information processing apparatus 101 is the information processing apparatus of the present embodiment. The information processing apparatus 101 includes an input interface 102, a CPU 103, a ROM 104, a RAM 105, an external storage device 106, an output interface 107, a display unit 108, a communication unit 110, a near-field communication unit 111, and the like. The CPU 103, the ROM 104, the RAM 105, and the like form a computer of the information processing apparatus 101.

The input interface 102 is an interface for receiving a data input and an operation instruction from a user in a case where an operation unit such as a keyboard 109 is operated. Note that the operation unit may be a physical keyboard, a physical button, or the like, or may be a software button such as a software keyboard displayed on the display unit 108. Specifically, the input interface 102 may receive an input (operation) from the user via the display unit 108.

The CPU 103 is a system control unit, and controls the entire information processing apparatus 101. The ROM 104 stores fixed data such as control programs configured to be executed by the CPU 103, a data table, and an embedded operating system (hereinafter, referred to as OS) program. In the present embodiment, each of the control programs stored in the ROM 104 performs software execution control such as scheduling, task switching, and interruption processing under management of the embedded OS stored in the ROM 104.

The RAM 105 is formed of a static random access memory (SRAM) or the like that requires a backup power supply. Note that, since the RAM 105 holds data by using a primary cell (not illustrated) for data backup, important data such as program control variables can be stored without being volatile. Moreover, a memory area that stores setting information of the information processing apparatus 101, management data of the information processing apparatus 101, or the like is also provided in the RAM 105. Furthermore, the RAM 105 is used also as a main memory or a work memory of the CPU 103.

The external storage device 106 saves an application program (hereinafter, setting application) for executing the network setup of the communication apparatus 151, a printing information generation program that generates printing information interpretable by the communication apparatus 151, and the like. The setting application is an application program for performing setting of the access point that is a connection destination of the communication apparatus 151. Note that the setting application may have functions other than the network setup function. For example, the setting application may have a function of causing the communication apparatus 151 to execute printing, a function of causing the communication apparatus 151 to scan a set original, a function of checking a state of the communication apparatus 151, or the like. For example, the setting application is stored in the external storage device 106 by being installed from an external server by Internet commutation via the communication unit 110. Moreover, the external storage device 106 saves various programs such as an information exchange control program that exchanges information with the communication apparatus 151 connected via the communication unit 110 and various pieces of information used by these programs.

The output interface 107 is an interface configured to perform control that allows the display unit 108 to display data or to perform notification of a state of the information processing apparatus 101. The display unit 108 is formed of a light emitting diode (LED) or a liquid crystal display (LCD), and performs the display of data and the notification of the state of the information processing apparatus 101.

The communication unit 110 is a configuration for executing data communication by being connected to an apparatus such as the communication apparatus 151 or the access point 131. For example, the communication unit 110 can be connected to an access point (not illustrated) in the communication apparatus 151. Connection of the communication unit 110 and the access point in the communication apparatus 151 allows the information processing apparatus 101 and the communication apparatus 151 to communicate with each other. Note that the communication unit 110 may directly communicate with the communication apparatus 151 by wireless communication, or communicate via an external apparatus present outside the information processing apparatus 101 or the communication apparatus 151. Note that the external apparatus includes an external access point (access point 131 or the like) present outside the information processing apparatus 101 and the communication apparatus 151 and an apparatus capable of relaying communication other than the access point. In the present embodiment, a wireless communication method used by the communication unit 110 is assumed to be Wireless Fidelity (Wi-Fi) (registered trademark) that is a communication standard conforming to IEEE 802.11 series. Moreover, the network setup processing is assumed to be executed by communication performed by the communication unit 110.

Moreover, examples of the access point 131 include devices such as a wireless LAN router. Note that, in the present embodiment, a method of directly connecting the information processing apparatus 101 and the communication apparatus 151 to each other without the external access point is referred to as direct connection method. Meanwhile, a method of connecting the information processing apparatus 101 and the communication apparatus 151 to each other via the external access point is referred to as infrastructure connection method.

The near-field communication unit 111 executes data communication by being wirelessly connected to apparatuses such as the communication apparatus 151 in a near field, and performs communication by a communication method different from that of the communication unit 110. The near-field communication unit 111 can be connected to, for example, a near-field communication unit 157 in the communication apparatus 151. Examples of the communication method include near-field communication (NFC), Bluetooth (registered trademark) Classic, Bluetooth Low Energy (BLE), Wi-Fi Aware, and the like.

The communication apparatus 151 is the communication apparatus of the present embodiment. The communication apparatus 151 includes a ROM 152, a RAM 153, a CPU 154, a print engine 155, a communication unit 156, the near-field communication unit 157, and the like. The ROM 152, the RAM 153, the CPU 154, and the like form a computer of the communication apparatus 151.

The communication unit 156 includes an access point for connection to apparatuses such as the information processing apparatus 101, as the access point inside the communication apparatus 151. Note that this access point can be connected to the communication unit 110 of the information processing apparatus 101. The communication unit 156 enables this access point, and the communication apparatus 151 thereby operates as the access point. Note that the communication unit 156 may be directly, wirelessly connected to the information processing apparatus 101, or may be wirelessly connected to the information processing apparatus 101 via the access point 131. In the present embodiment, a wireless communication method used by the communication unit 156 is assumed to be the communication standard conforming to IEEE 802.11 series. Moreover, in the following explanation, Wireless Fidelity (Wi-Fi) (registered trademark) (Wi-Fi communication) is the communication standard conforming to IEEE 802.11 series. Moreover, the communication unit 156 may include hardware that functions as the access point, or may operate as the access point by using software that causes the communication unit 156 to function as the access point.

The communication apparatus 151 of the present embodiment can operate in an infrastructure mode and a peer-to-peer (P2P) mode, as a mode of communication performed by using the communication unit 156. The infrastructure mode is a mode in which the communication apparatus 151 communicates with the other apparatus such as the information processing apparatus 101 via the external apparatus (for example, access point 131) forming the network. Connection to the external access point established by the communication apparatus 151 operating in the infrastructure mode is referred to as infrastructure connection. In the present embodiment, in the infrastructure connection, the communication apparatus 151 operates as a slave station, and the external access point operates as a master station. Note that the master station in the present embodiment is an apparatus that determines a communication channel to be used in the network to which the master station belongs, and the slave station is an apparatus that does not determine the communication channel to be used in the network to which the slave station belongs and that uses the communication channel determined by the master station.

The P2P mode is a mode in which the communication apparatus 151 directly communicates with the other apparatus such as the information processing apparatus 101 without using the external apparatus forming the network. In the present embodiment, the P2P mode is assumed to include an AP mode in which the communication apparatus 151 operates as the access point. Connection information (SSID or password) of the access point enabled in the communication apparatus 151 in the AP mode is assumed to be connection information that can be set to any connection information by the user. Note that the P2P mode may include, for example, a WFD mode in which the communication apparatus 151 performs communication by Wi-Fi Direct (WFD). Note that which one of multiple WFD-compatible apparatuses is to operate as the master station is determined according to, for example, a sequence called group owner negotiation. The master station may be determined without execution of group owner negotiation. An apparatus that is the WFD-compatible apparatus and that serves a role of the master station is particularly referred to as group owner. Direct connection with the other apparatus established by the communication apparatus 151 operating in the P2P mode is referred to as direct connection. In the present embodiment, in the direct connection, the communication apparatus 151 operates as the master station, and the other device operates as the slave station.

Moreover, in the present embodiment, the communication apparatus 151 can operate in a network setup mode (cable-less setup mode) by receiving a predetermined operation from the user, the network setup mode being a mode in which the network setup of the communication apparatus 151 is executed. In the case where the communication apparatus 151 operates in the network setup mode, the communication apparatus 151 uses the communication unit 156 to operate as a setup access point that is enabled during the operation in the network setup mode.

The setup access point is an access point different from the access point enabled in the above-mentioned AP mode. Moreover, the SSID of the setup access point is assumed to include a predetermined character string from which the setting application of the information processing apparatus 101 is recognizable. Furthermore, the setup access point is assumed to be an access point that requires no password for connection. Moreover, the communication apparatus 151 operating in the network setup mode is assumed to use a predetermined communication protocol (setup communication protocol) in communication with the information processing apparatus 101 connected to the setup access point.

A specific example of the setup communication protocol is simple network management protocol (SNMP). In the case where the communication apparatus 151 starts the operation in the network setup mode and then predetermined time elapses, the communication apparatus 151 stops the operation in the network setup mode, and disables the setup access point. This is due to the following reason. Since the setup access point is an access point that requires no password as described above, the possibility of the setup access point receiving connection request from an inappropriate apparatus increases if the setup access point is enabled for a long time. Note that the setup access point may be an access point that requires a password. In this case, the password used for connection to the setup access point is assumed to be a fixed password (password unchangeable by the user) grasped in advance by the setting application.

The near-field communication unit 157 is wirelessly connected to an apparatus such as the information processing apparatus 101 in a near-field, and can be connected to, for example, the near-field communication unit 111 in the information processing apparatus 101. The communication method includes, for example, NFC, Bluetooth Classic, BLE, Wi-Fi Aware, and the like.

The RAM 153 is formed of a SRAM or the like that requires a backup power supply. Note that, since the RAM 153 holds data by using a primary cell (not illustrated) for data backup, important data such as program control variables can be stored without being volatile. Moreover, a memory area that stores setting information of the communication apparatus 151, management data of the communication apparatus 151, or the like is also provided in the RAM 153. Furthermore, the RAM 153 is used also as a main memory and a work memory of the CPU 154, is used as a reception buffer for temporarily saving the printing information received from the information processing apparatus 101 or the like, and saves various pieces of information.

The ROM 152 stores fixed data such as control programs configured to be executed by the CPU 154, a data table, and an OS program. In the present embodiment, each of the control programs stored in the ROM 152 performs software execution control such as scheduling, task switching, and interruption processing under management of the embedded OS stored in the ROM 152.

The CPU 154 is a system control unit, and controls the entire communication apparatus 151. The print engine 155 forms an image on a print medium such as paper by applying a printing material such as ink onto the print medium based on information saved in the RAM 153 or a print job received from the information processing apparatus 101 or the like, and outputs a print result. Note that, since the data amount of the print job sent from the information processing apparatus 101 or the like is generally large, a communication method capable of high-speed communication is required to be used in communication of the print job. Accordingly, the communication apparatus 151 receives the print job via the communication unit 156 capable of performing communication at higher speed than the near-field communication unit 157.

Note that a memory such as an external HDD or an SD card may be mounted to the communication apparatus 151 as an optional device, and the information saved in the communication apparatus 151 may be saved in this memory.

An input interface 158 is an interface for receiving a data input and an operation instruction from the user in the case where an operation unit 159 such as a physical button is operated. Note that the operation unit may be a software keyboard, a software button, or the like displayed on a display unit 161. Specifically, the input interface 158 may receive an input from the user via the display unit 161.

An output interface 160 is an interface that performs control for causing the display unit 161 to display data or to perform notification of the state of the communication apparatus 151. The display unit 161 is formed of a light emitting diode (LED) or a liquid crystal display (LCD), and performs the display of data and the notification of the state of the communication apparatus 151.

Figure 2:
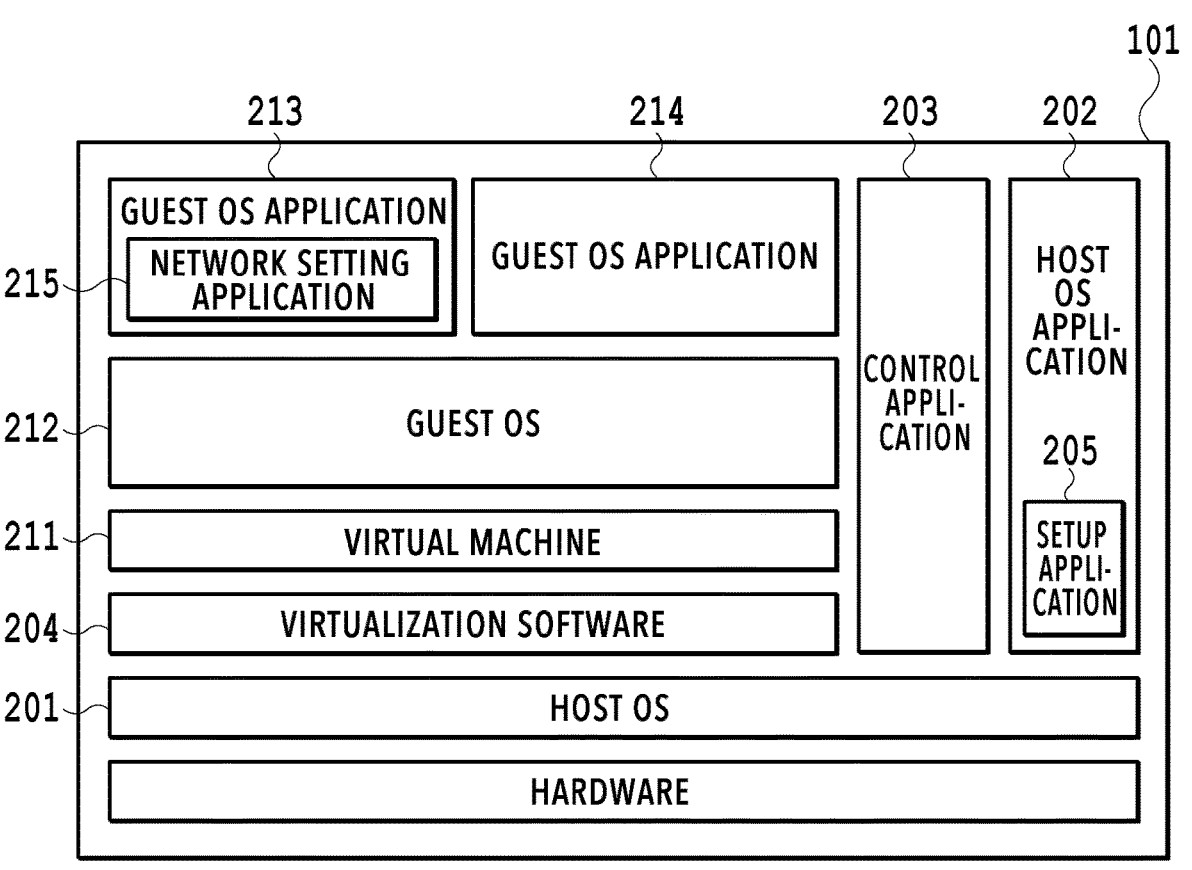
FIG. 2 is a diagram illustrating a software configuration of an information processing apparatus.

FIG. 2 is a block diagram illustrating a software configuration of the information processing apparatus 101 according to the present embodiment. The information processing apparatus 101 includes a host OS 201, a host OS application 202, a control application 203, virtualization software 204, a virtual machine 211, a guest OS 212, guest OS applications 213 and 214, and the like.

The host OS 201 is base software that provides basic functions and manages the entire information processing apparatus 101. The virtualization software 204 is software for forming the virtual machine 211 on the information processing apparatus 101. The virtual machine 211 is an information processing apparatus virtually formed in a physically-singular information processing apparatus. In the present embodiment, the virtualization software 204 operates on the host OS 201. The guest OS 212 is an OS that operates on the virtual machine 211. The guest OS applications 213 and 214 are application programs that operate on the guest OS 212, for example, a setting application or picture browsing software. Moreover, in the present embodiment, the guest OS application 213 includes a network setting application 215 (also referred to as first application) that is an application for performing wireless network setting processing of an image processing apparatus.

The control application 203 is an application program for controlling the virtualization software 204. In this example, the control application 203 operates on the host OS 201.

The host OS application 202 is an application program that operates on the host OS 201. For example, the host OS application 202 is a store application from which various application programs can be purchased. The control application 203 is also one type of host OS application 202 in a broad sense. Moreover, in the present embodiment, the host OS application 202 includes a setup application 205 (also referred to as second application) that is an application for performing wireless setting such as network setup of the image processing apparatus and other setting processes. The network setup is one of method for performing wireless network setting. Note that the network setting application 215 operating on the guest OS 212 and the setup application 205 operating on the host OS 201 are setting applications provided by the vendor of the communication apparatus 151.

Moreover, the guest OS 212 has a linking function between the host OS application 202 and the guest OS applications 213 and 214. Specifically, this function is a function as follows. A function of file sharing (Intent) between applications provided by the guest OS 212 is invoked from the guest OS application 213. Then, a file subjected to the file sharing and the host OS application 202 corresponding to a file format of this file can be launched together.

Figure 3:
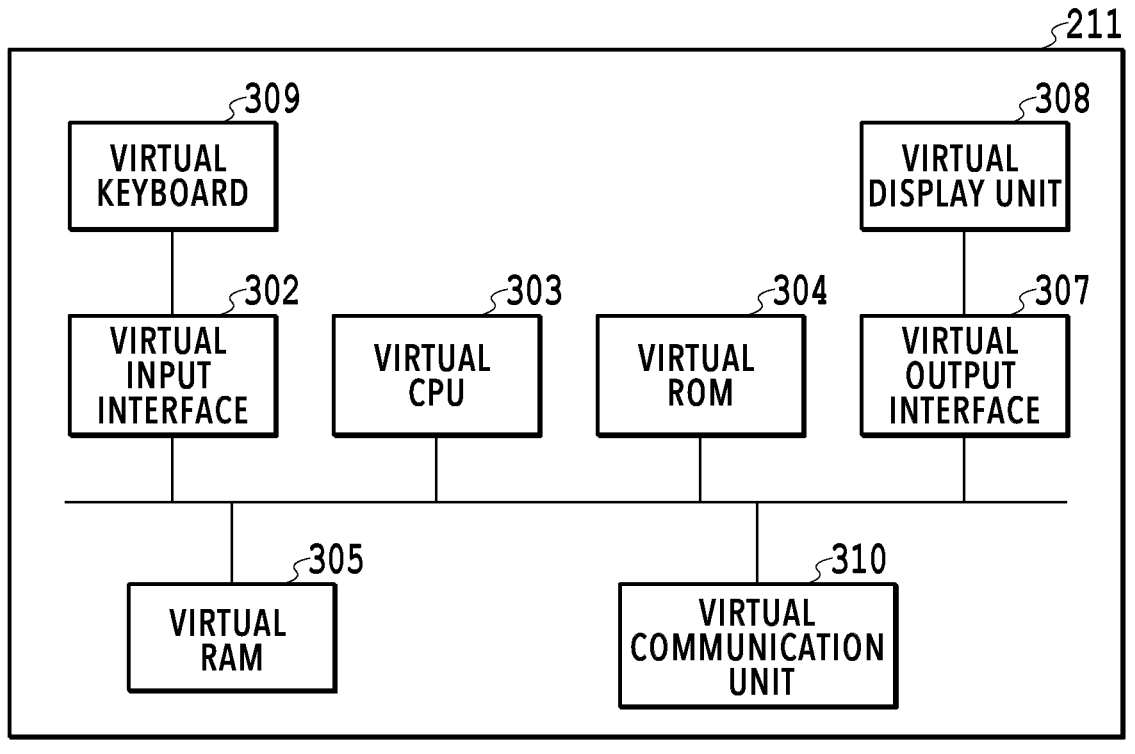
FIG. 3 is a diagram illustrating a software configuration of a virtual machine.

FIG. 3 is a diagram illustrating a configuration of the virtual machine 211. The virtual machine 211 is formed of a virtual input interface 302, a virtual CPU 303, a virtual ROM 304, a virtual RAM 305, a virtual output interface 307, a virtual display unit 308, the keyboard 109, and a virtual communication unit 310. Although this is a virtual configuration, these units have functions corresponding to the input interface 102, the CPU 103, the ROM 104, the RAM 105, the output interface 107, the display unit 108, the keyboard 109, and the communication unit 110, respectively. The virtual machine 211 is executed as described above by the virtualization software 204 operating on the host OS 201 of the information processing apparatus 101.

There is known a technique in which an OS different from the host OS can be operated in the host OS as the guest OS by using a virtual machine technology in the information processing apparatus. For example, Android OS that is a mobile OS can run as the guest OS on Windows OS that is running as the host OS, and an application for Android OS can be executed on Windows OS.

However, there is a case where specific setting cannot be executed on the guest OS due to limiting matters of emulation of the guest OS. For example, in the network setup processing of the communication apparatus 151 executed by using the network setting application 215, there is processing of obtaining the SSID of the access point in a surrounding area. In this processing, there is a case where the SSID of the access point in the surrounding area cannot be obtained due to limiting matters of the guest OS. Moreover, even if the obtaining of the SSID is successful, connection to the obtained SSID is not possible in the privileges of the guest OS. Accordingly, the network setup processing of the communication apparatus 151 fails, and the communication between the information processing apparatus 101 and the communication apparatus 151 cannot be established. Note that the user can execute the network setup processing by using the network setting application 215 on the host OS instead of the guest OS. However, there is a case where the user who launched the network setting application 215 on the guest OS does not know the reason of the failure of the network setup processing, and the network setup processing cannot be completed.

Accordingly, in the present embodiment, whether the network setting application 215 that operates on the guest OS 212 is operating on the guest OS 212 is determined. In the case where the network setting application 215 is operating on the guest OS 212, control processing of prompting launch of the setup application 205 that operates on the host OS 201 is executed. Specifically, a guidance screen as illustrated in FIG. 4C to be described later is displayed on the information processing apparatus. This can reduce failure of the network setup processing of the communication apparatus 151, and establish communication between the information processing apparatus 101 and the communication apparatus 151. Accordingly, improvements in usability for the user can be expected. Moreover, executing notification of the failure reason of the network setup processing allows the user to recognize the failure reason of the network setup processing.

FIGS. 4A to 4C are diagrams illustrating a display screen of the network setting application 215. The network setting application 215 that operates in response to a user operation on the display unit 108 of the information processing apparatus 101 is explained by using FIGS. 4A to 4C. FIG. 4A is a screen in which the network setting application 215 included in the guest OS application 213 is launched. A screen 401 is a screen displayed on the display unit 108 of the information processing apparatus 101. Executing the network setting application 215 on the screen 401 causes an image of the virtual display unit 308 to be displayed as an UI 402. A button 403 for the case where no printer is found is displayed on the UI 402. The processing of the network setting application 215 in the case where the button 403 for the case where no printer is found is pressed is illustrated in the flowchart of FIG. 5.

Figure 5:
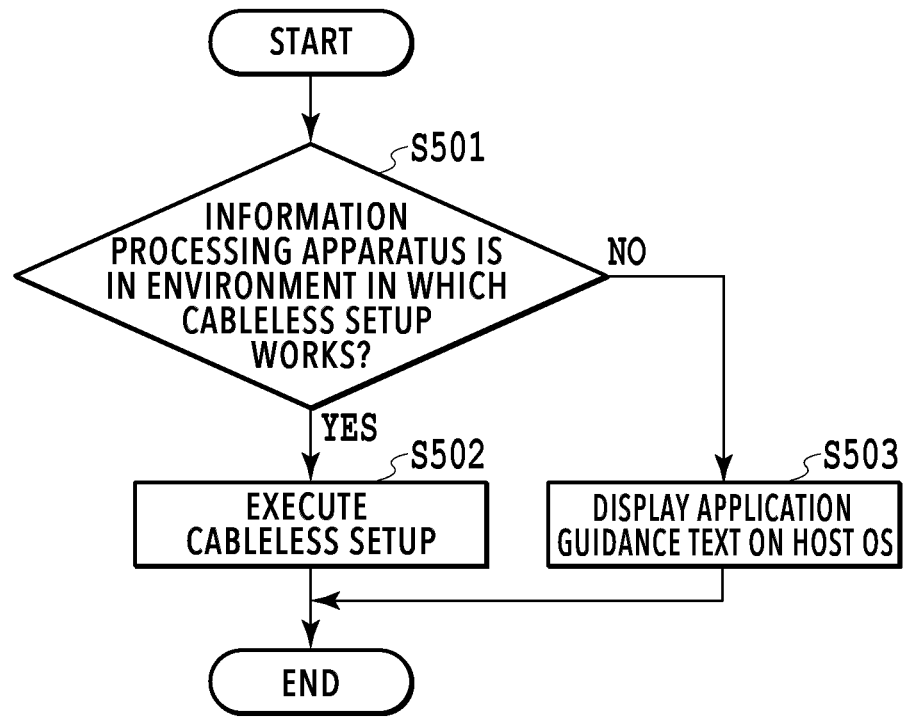
FIG. 5 is a flowchart explaining processing of the network setting application.

FIG. 5 is a flowchart explaining processing in the network setting application 215 that is an application on the guest OS executed by the virtual machine 211 of the present embodiment. The virtual CPU 303 of the virtual machine 211 implements the present processing by loading a program stored in the virtual ROM 304 or the virtual RAM 305 to the virtual RAM 305 and executing the program. Moreover, the present processing is started by the launch of the network setting application 215 by the user operation. Note that symbol "S" in explanation of each process means step in this flowchart.

In S501, the virtual machine 211 determines whether the information processing apparatus 101 is in an environment in which the network setup can be executed. Specifically, the virtual machine 211 determines whether the information processing apparatus 101 is in an environment in which the network setup can be executed, from information on the OS on which the network setting application 215 is operating, a terminal name, or an error value of API call in the network setup used by the network setting application 215. In the case where the virtual machine 211 determines YES (information processing apparatus 101 is in an environment in which the network setup can be executed) in S501, the virtual machine 211 proceeds to S502. Meanwhile, in the case where the virtual machine 211 determines NO (information processing apparatus 101 is in an environment in which the network setup cannot be executed) in S501, the virtual machine 211 proceeds to S503.

In S502, the virtual machine 211 displays a screen of FIG. 4B in a UI display 402 portion, proceeds to an execution screen of the network setup to the communication apparatus 151, and executes the network setup. Specifically, the virtual machine 211 sends connection information (SSID or password) of the access point 131 to the communication apparatus 151 by using a predetermined protocol. Then, the virtual machine 211 terminates the processing of the present flowchart. FIG. 4B is a screen in which the setup is executed and that is the network setting application 215. In the case where the user presses a button 411, the network setting application 215 automatically determines the communication method with the communication apparatus 151, and proceeds with the network setup. In the case where the user presses a button 412, the network setting application 215 transitions to a screen for selecting the communication method with the communication apparatus 151 (not illustrated).

In S503, the virtual machine 211 displays a screen of FIG. 4C in a UI display 502 portion. Then, the virtual machine 211 terminates the processing of the present flowchart. Specifically, the virtual machine 211 notifies the user of information indicating that the network setup cannot be executed in the network setting application 215 included in the guest OS application operating on the virtual machine 211. Moreover, in the notification, the virtual machine 211 may display information prompting use of the setup application 205 that runs on the host OS.

As described above, according to the present embodiment, usability of the network setting is improved. Specifically, even when a user executes an application on a guest OS in which network settings cannot be configured, the user can be appropriately guided to perform network settings.

Embodiment 2

In Embodiment 1, in the case where the network setting application 215 is executed in the virtual machine 211 in which the network setup cannot be executed, the guidance is performed by displaying the UI. In the present embodiment, explanation is given of an embodiment in which the host OS application that runs on the host OS 201 is invoked from the guest OS application of the virtual machine 211 by using a linking function of the guest OS application and the host OS application that runs on the host OS 201.

The present embodiment is Embodiment 1 modified as appropriate. Accordingly, the software configuration or the system configuration diagrams are common, and explanation thereof is thus omitted.

Figure 6:
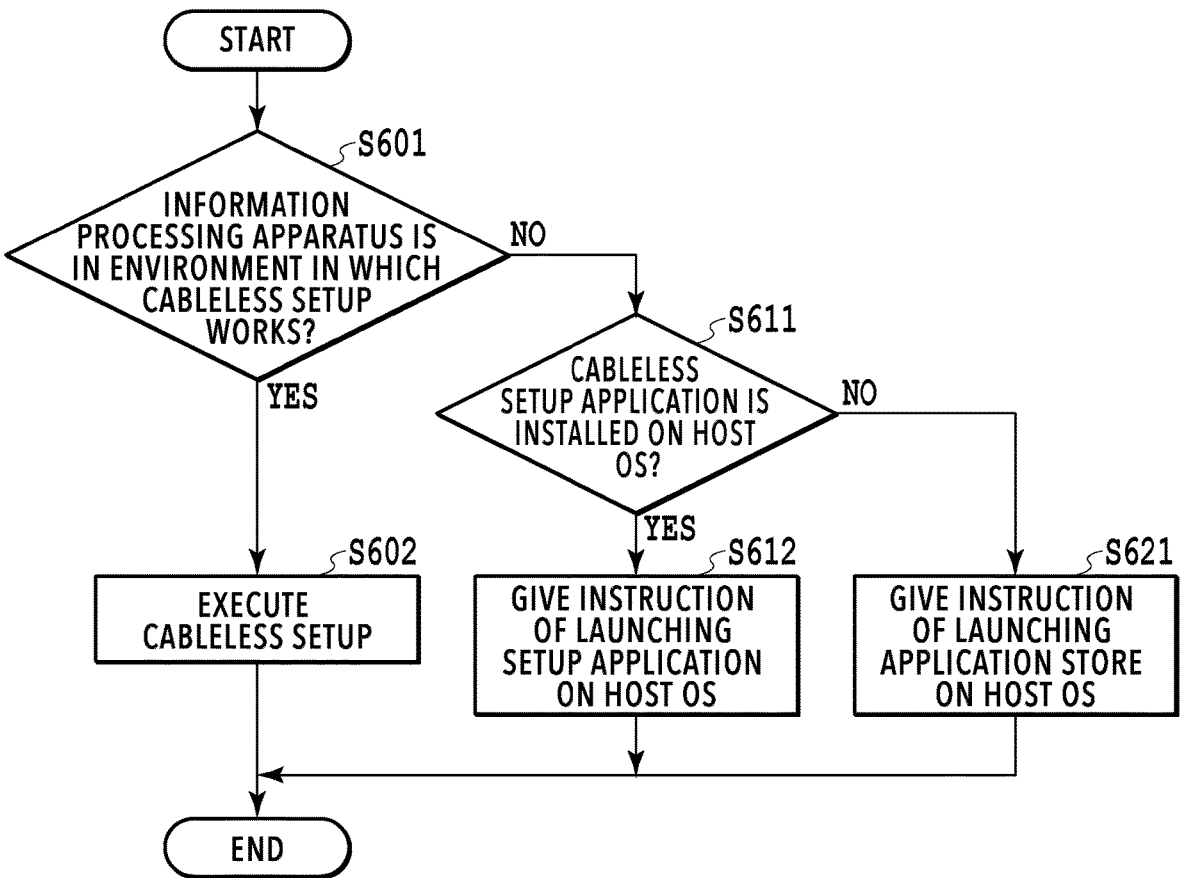
FIG. 6 is a flowchart explaining processing of the network setting application.

FIG. 6 is a flowchart explaining processing of the network setting application 215 that is the guest OS application 213 executed by the virtual machine 211 of the present embodiment. The virtual CPU 303 of the virtual machine 211 implements the flowchart of FIG. 6 by loading a program stored in the virtual ROM 304 or the virtual RAM 305 to the virtual RAM 305 and executing the program.

Since processing of S601 and S602 is the same as the processing of S501 and S502 in FIG. 5, explanation thereof is omitted. In the case where the virtual machine 211 determines No in S601, the virtual machine 211 proceeds to S611.

In S611, the virtual machine 211 determines whether the application for network setup is installed on the host OS, by using the linking function of the network setting application 215 and the host OS application 202. In the case where the virtual machine 211 determines Yes (installed) in S611, the virtual machine 211 proceeds to S612. Meanwhile, in the case where the virtual machine 211 determines No (not installed), the virtual machine 211 proceeds to S621.

In S612, the virtual machine 211 gives an instruction of launch to the setup application 205 on the host OS 201 by using the linking function. Then, the virtual machine 211 terminates the processing of the present flowchart.

The launch instruction of the setup application given by the virtual machine 211 launches the setup application 205 as the host OS application 202 that operates on the CPU 103 on the host OS side.

Figure 7:
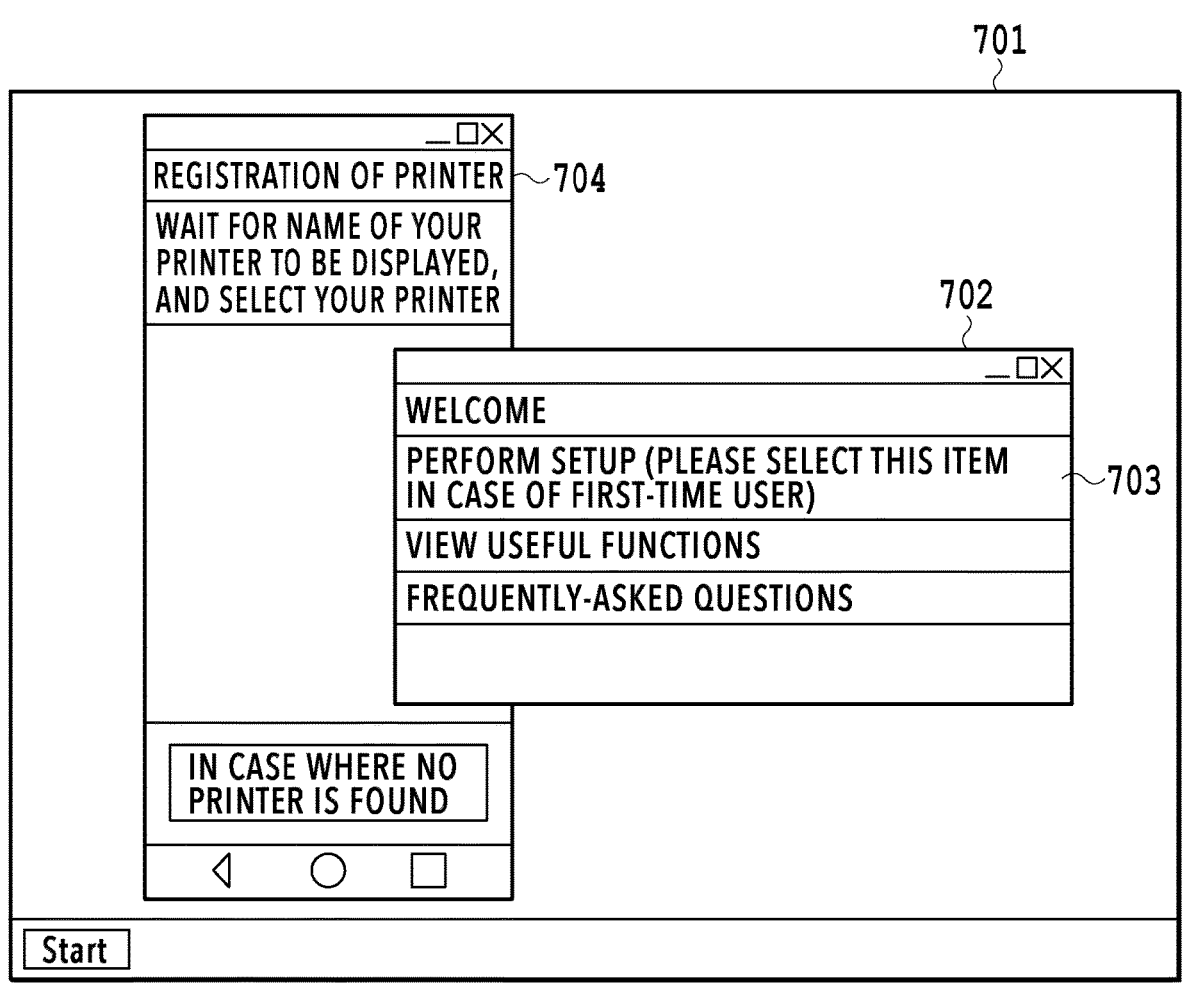
FIG. 7 is a diagram illustrating a display screen displayed by a setup application.

FIG. 7 is a diagram illustrating a display screen displayed by the setup application 205 included in the host OS application 202. A screen 701 is a screen displayed on the display unit 108. A screen 702 is a state where the setup application 205 being the host OS application 202 is launched. A screen 703 is one of menus of the setup application 205. Pressing the present screen enables execution of the network setup. A screen 704 is an example of a display screen displayed by the setup application 205.

In the case where the setup application 205 on the host OS is launched, the display unit 108 of the information processing apparatus 101 switches to the screen 701 of FIG. 7. Since the setup application 205 is an application that operates on the host OS application, the setup application 205 can perform the network setup. Accordingly, the user can cause the network setup to be executed by pressing "perform setup" in the screen 703.

In S621, since the setup application 205 is not installed on the host OS, the virtual machine 211 gives an instruction of launch to an application store on the host OS 201 by using the linking function. Then, the virtual machine 211 terminates the processing of the present flowchart.

In the case where the instruction of the application store launch on the host OS 201 is received in S621, a store application is launched on the host OS side as the host OS application 202 that runs on the CPU 103 (not illustrated). In this case, sending information (application ID) on the setup application on the application store together with the launch instruction from the guest OS application 213 enables guidance to a download page of the setup application together with the launch of the application store. Note that, although only the launch of the application store is illustrated in S621, there may be performed an operation in which a dialog as illustrated in FIG. 4C of Embodiment 1 is displayed on the screen 704 of FIG. 7 and the user is guided to use the application on the host OS.

In addition, information of execution of the setup may be added to the instruction of the launch of the setup application 205 on the host OS 201 in S612. For example, a parameter of exec=setup may be added to a parameter instructing the launch. In this case, the launch on the setup application side starts from a setup screen (not illustrated) in a state after pressing of the screen 703 in FIG. 7.

Moreover, in the case where the instruction of launch is given to the setup application on the host OS 201 in S612, information of execution of the network setup may be added. For example, a parameter of exec=CableLessSetup may be added to the parameter instructing the launch. In this case, the launch on the setup application side starts from a network setup screen (not illustrated) in a state after pressing of the screen 703 in FIG. 7.

As in the above explanation, according to Embodiment 2, the host OS application 202 that runs on the host OS 201 can be invoked and executed from the guest OS application by using the linking function of the guest OS application and the host OS application that runs on the host OS 201. Thereby, even if the user mistakenly executes the network setting application 215 running on the virtual machine 211, the user can be easily guided to execute the network settings.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-066566, filed Apr. 14, 2023, which is hereby incorporated by reference wherein in its entirety.

What is claimed is:

1. An information processing apparatus that operates with a first OS (Operating System) and that includes an application configured to perform wireless network setting processing and to operate on a second OS controllable on the first OS, the information processing apparatus comprising:

a control unit configured to execute control processing for performing specific setting processing in the wireless network setting processing on the first OS in a case where the application is unable to perform the specific setting processing, wherein the case where the application is unable to perform the specific setting processing includes at least a case where the second OS is unable to obtain an SSID of an access point used for connection with a communication apparatus different from the information processing apparatus or a case where the second OS is unable to connect to the access point of the SSID.

2. The information processing apparatus according to claim 1, wherein the specific setting processing is performing control processing of controlling the information processing apparatus such that the information processing apparatus sends connection information for connection to the access point, to the communication apparatus through communication with the communication apparatus using a predetermined protocol.

3. The information processing apparatus according to claim 2, wherein the predetermined protocol is simple network management protocol.

4. The information processing apparatus according to claim 1, wherein the communication apparatus is a printer.

5. The information processing apparatus according to claim 1, wherein the control unit displays a screen prompting launch of an application configured to operate on the first OS.

6. The information processing apparatus according to claim 5, wherein, in a case where the first OS includes a second application capable of performing the specific setting processing, the control unit instructs the first OS to launch the second application.

7. The information processing apparatus according to claim 6, wherein, in a case where the control unit instructs the first OS to launch the second application, the control unit sends information for executing the specific setting processing.

8. The information processing apparatus according to claim 5, wherein, in a case where the first OS does not include an application capable of performing the specific setting processing, the control unit instructs the first OS to launch an application store for obtaining a second application capable of performing the specific setting processing.

9. The information processing apparatus according to claim 1, further comprising a determination unit configured to determine whether or not the application is unable to perform the specific setting processing, wherein the control unit executes the control processing in a case where the determination unit determines that the application is unable to perform the specific setting processing.

10. A non-transitory computer readable storage medium storing a program which functions in an information processing apparatus that operates with a first OS (Operating System) and that includes an application configured to perform wireless network setting processing and to operate on a second OS controllable on the first OS, the program causing the information processing apparatus to function as a control unit that executes control processing for performing specific setting processing in wireless network setting processing on the first OS in a case where the application is unable to perform the specific setting processing, wherein the case where the application is unable to perform the specific setting processing includes at least a case where the second OS is unable to obtain an SSID of an access point used for connection with a communication apparatus different from the information processing apparatus or a case where the second OS is unable to connect to the access point of the SSID.

11. A control method of an information processing apparatus that operates with a first OS (Operating System) and that includes an application configured to perform wireless network setting processing and to operate on a second OS controllable on the first OS, the control method comprising:

executing control processing for performing specific setting processing in the wireless network setting processing on the first OS in a case where the application is unable to perform the specific setting processing, wherein the case where the application is unable to perform the specific setting processing includes at least a case where the second OS is unable to obtain an SSID of an access point used for connection with a communication apparatus different from the information processing apparatus or a case where the second OS is unable to connect to the access point of the SSID.

* * * * *